United States Patent
Williams et al.

(10) Patent No.: US 6,865,844 B2
(45) Date of Patent: *Mar. 15, 2005

(54) FIRE AND BARRIER FOAM

(75) Inventors: R. Brent Williams, Houston, TX (US); Kenneth L. White, Alvin, TX (US); Gregory L. Clark, League City, TX (US)

(73) Assignee: Centerpoint Energy, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 654 days.

(21) Appl. No.: 09/586,912

(22) Filed: Jun. 5, 2000

(65) Prior Publication Data

US 2002/0029511 A1 Mar. 14, 2002

Related U.S. Application Data

(63) Continuation of application No. 09/304,019, filed on May 3, 1999, now Pat. No. 6,591,546.

(51) Int. Cl.[7] ............................................. A01M 1/20
(52) U.S. Cl. ...................................... 43/132.1; 43/124
(58) Field of Search ................................ 43/124, 132.1

(56) References Cited

U.S. PATENT DOCUMENTS

| | | |
|---|---|---|
| 2,899,771 A | 8/1959 | Burris, Jr. |
| 2,952,938 A | 9/1960 | Abrams |
| 3,816,610 A | 6/1974 | Lusby |
| 3,841,032 A | 10/1974 | Grannis, III |
| 4,182,649 A * | 1/1980 | Isgur et al. ............... 161/101 |
| 4,267,399 A | 5/1981 | Lux, Jr. |
| RE31,134 E | 1/1983 | Lux, Jr. |
| 4,883,918 A | 11/1989 | Browning |
| 5,860,266 A | 1/1999 | Martinet |
| 5,881,493 A | 3/1999 | Restive |

FOREIGN PATENT DOCUMENTS

JP          61200188          9/1986

OTHER PUBLICATIONS

Great Stuff, www.flexibleproducts.com/ifp/consum/qs.htm, 1998.
Abisko, www.flexibleproducts.com/abisko/abisko.htm, 1998.
Insta–Foam Products, www.flexibleproducts.com/ifp/cpg/cpgmenu.htm. 1998.
Insta–Seal Polyurethane Foam Sealant, www.flexibleproducts.com/ifp/cpg/sealdata.htm, 1998.
Insta–Seal,www.flexibleproducts.com/ifp/cpg/inseal.htm, 1998.
Froth–Pak Two–Component Polyurethane Foam System, www.flexibleproducts.com/ifp/cpg/fptech.htm, 1998.
Froth–Pak Portable two component polyurethane, www.flexibleproducts.com/ifp/broth.htm, 1998.
Polyurethane Foam System, www.flexibleproducts.com/ifp/cpg/aboutcpg.htm, 1998.

* cited by examiner

Primary Examiner—Kurt Rowan
(74) Attorney, Agent, or Firm—Bracewell & Patterson, LLP

(57) ABSTRACT

A sealant for sealing around electrical conductors and/or conduits extending through an opening in a pad into a transformer housing. The sealant includes an insecticide dispersed throughout the sealant to kill the ants or insects attempting to enter the transformer housing through the pad opening.

9 Claims, 3 Drawing Sheets

FIRE AND BARRIER FOAM

This is a continuation of Ser. No. 09/304,019 filed May 3, 1999, now U.S. Pat. No. 6,591,546.

BACKGROUND OF THE INVENTION

1. Field of the Invention

The field of this invention relates to ground-level pad mounted transformer installations. The present invention relates to an expanding polymer foam composition containing an insecticide and a method of using the expanding foam as a barrier against insect intrusion.

2. Description of the Related Art

In recent years, the use of underground electrical distribution systems has increased. In the absence of traditional pole lines on which to place transformers, pad mounted transformers have become more common. The pad mounted transformer receives the high voltage underground electrical lines and steps the voltage down to usable household levels.

The above-ground location of the high voltage transformer presents safety concerns. To prevent unintentional contact with the high voltage lines and to prevent vandalism, the ground mounted transformers are encased in a housing. The underground high voltage lines usually enter the housing through a vertical opening in the pad.

The opening in the pad for an underground residential distribution (URD) transformer is normally approximately 30"×12". The primary and secondary conductors enter the transformer housing through this opening. This opening also provides an unintentional entry into a protected environment for certain pests such as fire ants, snakes and mice.

Fire ants are particularly attracted to the protected areas provided by the transformers. Fire ants are able to enter through a very small opening and can even create passages in the soil beneath the pad which will allow access into the transformer via the underground electrical lines, i.e., the primary and secondary conductors, through the pad opening.

The presence of a fire ant mound within the transformer housing can create a number of problems. For example, the ants may build a mound within the transformer housing by excavating dirt from the cable trench under the pad opening. Subsequent rain causes dirt under the front of the pad to wash into the cable trench. The front end of the pad loses support and begins to tilt. This can cause an internal electrical fault if an energized part is no longer covered by transformer fluid as a result of the shift of the pad from its normal horizontal orientation. A nearby lightning strike can cause a high impulse voltage to surge through the transformer circuits and the high impulse voltage can ground to the transformer housing if, as a result of pad tilting, the energized circuits are not covered and insulated by the transformer fluid.

The tilting can also put stress on conductors, elbows, bushings, bushing inserts and bushing wells which can cause a premature electrical fault caused by mechanical failure such as conductor breakage or disconnection of the conductors and leads. Tilting of the pad can also cause the conductor, which is fixed in place, to bend. This stretches and thins insulation on the outside radius of the conductor reducing the effectiveness of the insulation which may cause a premature fault. The tilting of the pad may also cause transformer fluid to leak from the transformer by damaging bushings connected to the transformer housing.

Since fire ants cannot regulate the temperature and humidity within an ant mound, the fire ants continually move ant larvae and the queen ant to different vertical levels within the ant mound to keep the larvae and queen in an environment having the proper temperature and humidity. Furthermore, the fire ants need to be able to move vertically within the mound in order to access water. Fire ants dig tunnels from the bottom of their mounds down to the water table. Restricting the fire ants' ability to move vertically within an ant mound will cause the ants to die or to move to another location. If a pre-existing barrier exists, which restrict fire ants from being able to move vertically downward within a mound, they are effectively deterred from building a mound at all.

The effectiveness of placing insecticides inside the transformer compartment is limited by EPA regulations requiring insecticide to biodegrade within a relatively short time. It is costly and impractical to renew insecticide treatment of transformer compartments every few months to maintain the presence of active insecticide when a lineman may not need to open the transformer for several years.

SUMMARY OF THE INVENTION

According to the invention, pad openings communicating with ground mounted URD transformer housings may be sealed with an insecticide-containing sealant to kill insects attempting to enter the housing by boring, eating or otherwise tunneling through the sealant.

One embodiment of the present invention provides a sealant that is an expanding polyurethane foam that is flexible in its final set form.

According to the present invention, the sealant contains one or more insecticides mixed therein to distribute the insecticide throughout the foam.

DETAILED DESCRIPTION OF INVENTION

Figure 1:
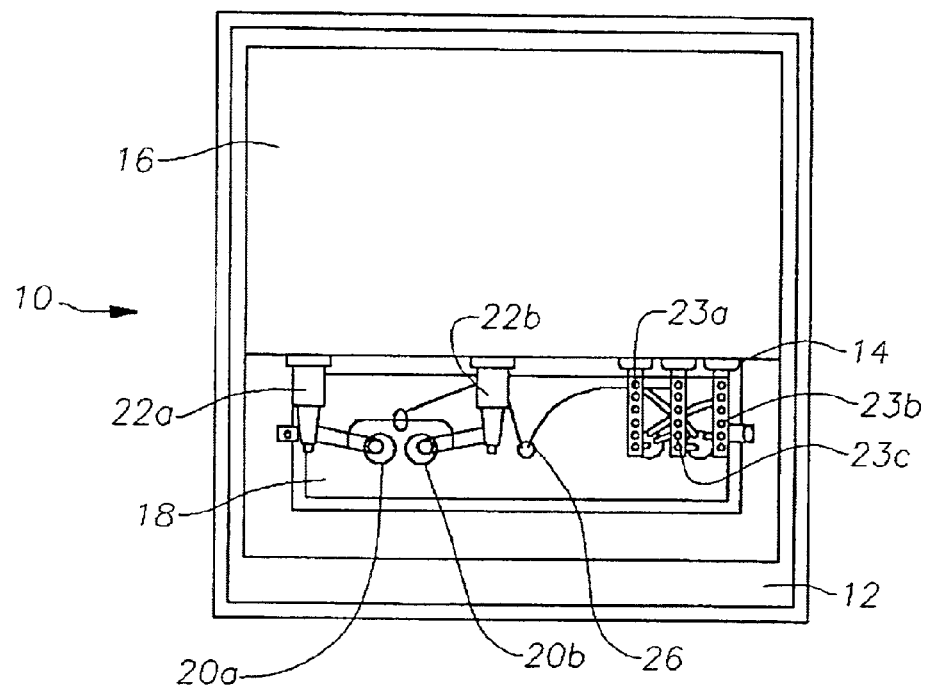
FIG. 1 is a plan view of a pad mounted transformer.
Figure 2:
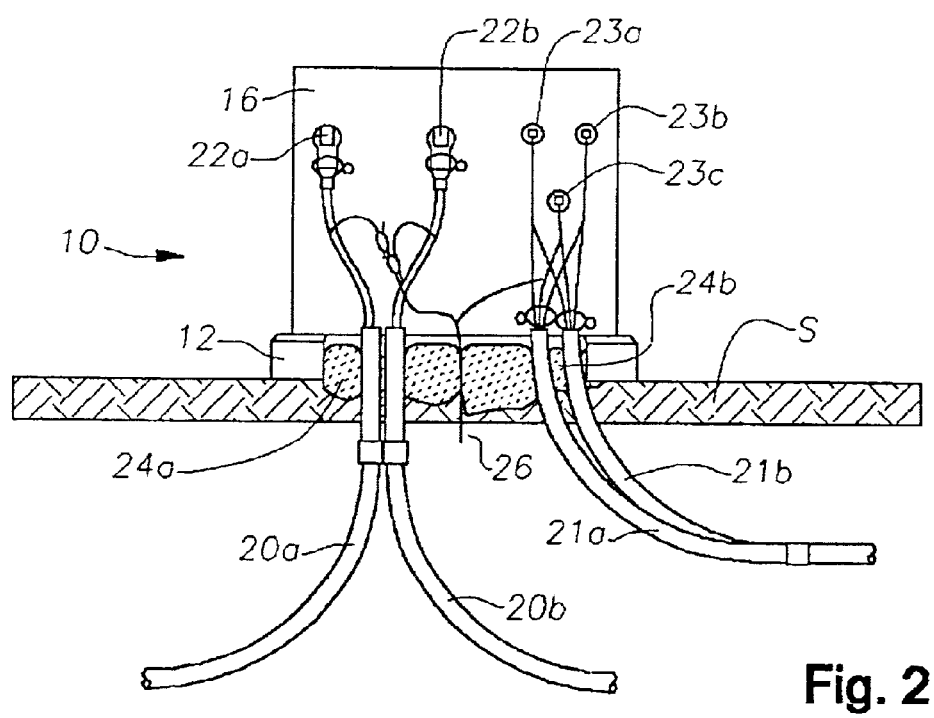
FIG. 2 is a front elevational view of a pad mounted transformer and associated underground cables, on a reduced scale as compared to FIG. 1, showing the insecticide-containing sealant in position on the ground and in the pad entry.
Figure 3:
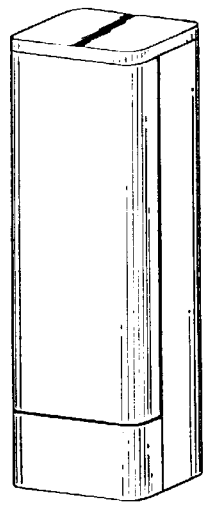
FIG. 3 is a communications junction box of rectangular configuration.
Figure 4:
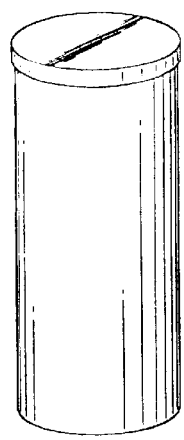
FIG. 4 is a communications junction box of cylindrical configuration.
Figure 5:
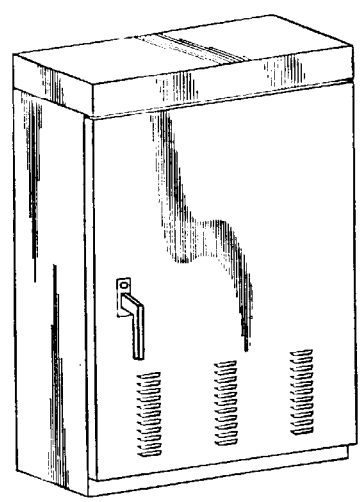
FIG. 5 is a terminal cabinet.
Figure 7:
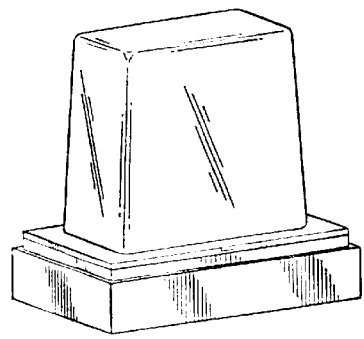
FIG. 7 is an electrical utility above grade, secondary distribution pedestal box.
Figure 6:
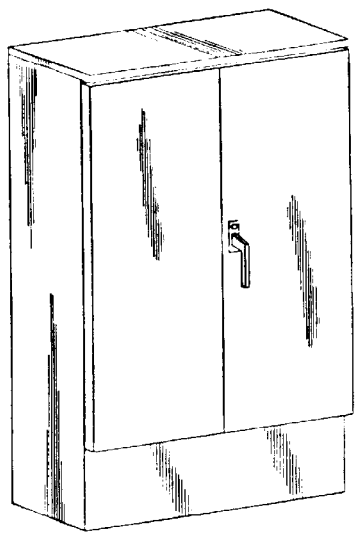
FIG. 6 is a terminal cabinet for electrical distribution switches and circuit breakers.
Figure 8:
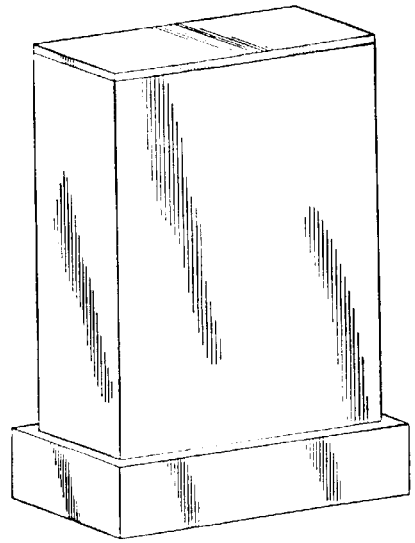
FIG. 8 is a pad mounted traffic signal control cabinet.
Figure 9:
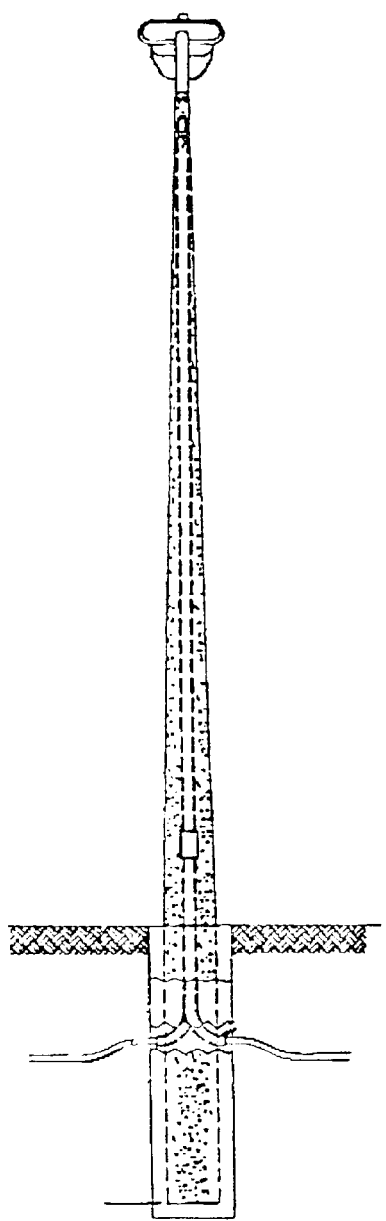
FIG. 9 is an end view, partly in section of a municipal street light of the type which utilizes a secondary pedestal box.
Figure 10:
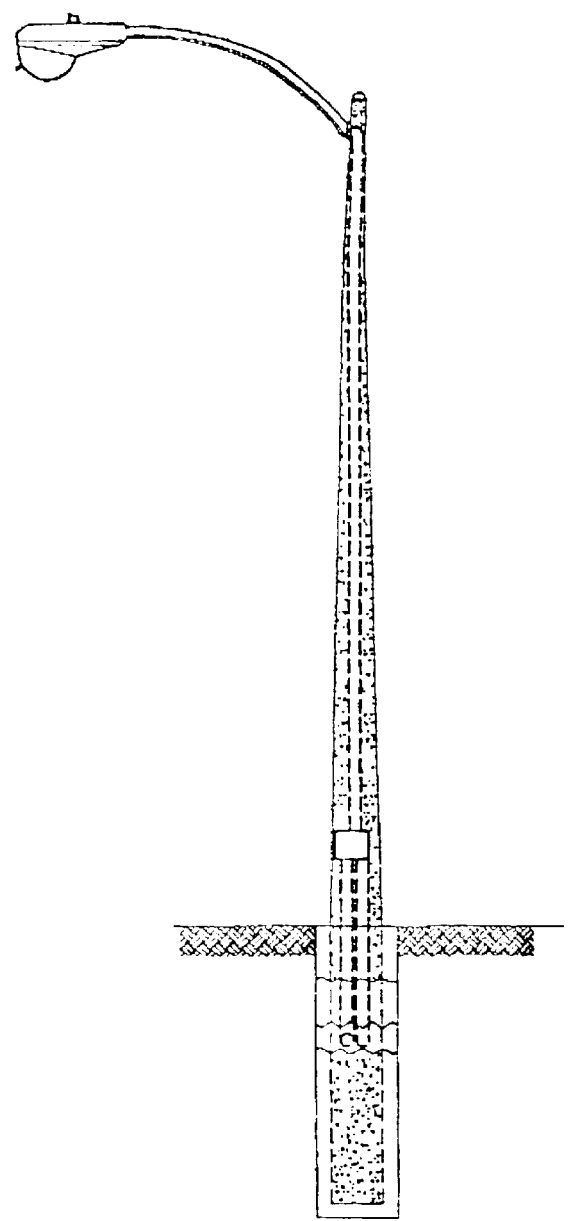
FIG. 10 is a side view of the street light of FIG. 9.

FIGS. 1 and 2 show one embodiment according to the present invention in which an opening in a concrete, polymer or other type pad which communicates with a URD transformer housing may be sealed with an insecticide-containing sealant which kills the insects to retard or prevent movement of insects into the housing through the pad opening. Fire ants are thus denied direct access from the transformer termination compartment located above the pad opening to the soil beneath the pad opening and then are deterred by the sealant barrier and further by the insecticide from building a mound within the pad opening above the sealant.

FIG. 2 shows a front elevation view of a pad mounted transformer 10 on a concrete pad 12, positioned on the soil S. The transformer 10 has a housing 14 with sealed fluid containing compartment 16 which contains electrically energized circuits (not shown) and an insulating oil. The transformer 10 also has a portion of the housing which can be opened (not shown) which encloses the pad opening 18, the underground primary and secondary cables 20 and 21, respectively, extending through the pad opening 18, the primary side external electrical connections 22, the secondary side external electrical connections 23 and the ground conductors 26 communicating through the sealed compartment 16 of the transformer 10.

FIGS. 1 and 2 show that the sealant 24 substantially fills the volume of space defined by the pad opening 18. The sealant 24 conforms to, and seals with the pad opening perimeter and irregular surfaces and crevices such as those found in the ground as shown in FIG. 2. The sealant 24 also conforms to and fills any spaces between closely spaced adjacent cables 20 and 21, conduits 25 and 27, ground conductors 26 and other structures which extend into the pad opening 18, as shown in FIG. 2.

As shown in FIGS. 1 and 2 the pad opening 18 allows underground cables 20 and 21 to extend into the transformer housing for attachment to the primary and secondary side electrical connections 22 and 23, respectively, of the transformer 10.

The sealant 24 is thoroughly dispersed with one or more insecticides, which is preferably selected from the group consisting of acephate (commercially available under the trademark ORTHENE), carbaryl (commercially available under the trademark SEVIN), pyrethroids plus piperonyl butoxide (commercially available under the trademark PYRENONE), aldicarb (commercially available under the trademark TEMIK) and azinphos-methyl (commercially available under the trademark GOWAN).

The insecticide is mixed with the sealant 24 in an amount sufficient to retard insect migration through an opening containing the sealant. In one embodiment of the present invention, about one ounce of acephate is added to about twenty ounces of an expanding foam sealant such as polyurethane.

The quantity of insecticide to retard insect migration is adjusted to compensate for such factors as the effectiveness of the insecticide used, the minimum time the insecticide-containing sealant must remain effective, and insecticide degradation due to environmental factors.

According to one embodiment of the present invention the insecticide, e.g. acephate or carbaryl, is a contact poison which does not require ingestion to be effective. Since some insects such as fire ants may eat the sealant, it is important to have the insecticides mixed with or dispersed with the sealant while the sealant is in liquid form rather than simply spraying the insecticide on the surface of the foam. This is particularly true for insecticides which rely on ingestion in order to kill the ants or other insects.

Preferably, the sealant 24 is an expanding foam such as a polyurethane composition. Further, one of ordinary skill in the art understands that the polyurethane foam may be either a rigid foam or a flexible foam, depending on the particular polyisocyanates and polyols chosen for the polyurethane foam formulation. In the event that ground subsidence occurs, caused by insects excavating dirt or otherwise, a flexible foam may put less stress on the cables 20 and 21 extending into the pad opening 18 and embedded in the sealant 24. The flexible foam will stretch and/or compress so as to maintain an effective seal around the cables 20 and 21 and/or conduits 25 and 27 and ground conduction 26 caused by the pad 12 shifting its position away from its normal horizontal orientation. Furthermore, flexible foams, in contrast to a solid and relatively impenetrable epoxy sealant, may be easily cut away for removal during any subsequent work needed in any previously sealed pad opening 18. Portions of flexible foam cut away for subsequent work may also be easily replaced with additional flexible foam after the work is completed.

One embodiment of the present invention comprises a polyurethane wherein one or more polyisocyanates and one or more polyols in liquid form are mixed with one or more insecticides and react substantially completely in not less than about one minute and in not more than about twenty-four hours. A second embodiment of the present invention comprises a polyurethane wherein one or more polyisocyanates in liquid form are mixed with one or more insecticides and react substantially completely in not less than about one minute and in not more than about 24 hours. A preferred minimum reaction time is from about five minutes to about one hour. For convenience, the maximum reaction time preferably is less than about eight hours. The minimum reaction time is chosen so as to allow time to permit proper application of the sealant in the pad opening 18 around and between any objects such as the conductors 20 and 21, conduits 25 and 27, and the ground conductors 26 to be embedded in the sealant foam before the sealant 24 sets-up to a solid foam. The maximum reaction time is chosen so as to permit subsequent short term inspection without disturbing an incompletely set-up foam sealant. The sealant preferably also has a flame retardant mixed in the foam while the foam is in the liquid state to reduce the possibility of an electrical fault igniting the sealant and to minimize the amount of sealant which will burn if ignited. Incorporation of the flame retardant into the sealant is especially preferred when the blowing agent is flammable, e.g., a hydrocarbon. The flame retardant may be any conventional flame retardant, for example, 1,1'-oxybis-(2,3,4,5,6)-pentabromobenzene (sold as DE83R by Great Lakes Chemical Co.).

A foam sealant may be formed using any conventional blowing agent such as water, nitrogen, carbon dioxide, hydrocarbons, fluorocarbons, chlorofluorocarbons, hydrofluorocarbons and hydrochlorofluorocarbons.

The sealant 24 may be used in other applications where it is desirable to retard insect movement and where underground service cables extend from the ground into a housing capable of providing a protected environment for insects. Some other typical applications in which the sealant 24 may be useful are in the secondary pedestal boxes of street lights, the secondary distribution pedestal boxes, the grade pull boxes at a street lights, primary service pull boxes, telecommunication junction cabinets and pedestals, CATV pedestals, and electrical distribution pad mounted switches sand circuit breaker.

Generally the method according to the present invention comprises the steps of dispersing an insecticide in a reactive, liquid sealing material to form an insecticide-sealing material blend, applying a quantity of the insecticide-sealing material blend in the opening in the pad and around the conductors and/or conduits sufficient to seal the opening in the pad, and allowing the reactive liquid sealing material to react sufficiently to form a solid sealant. One method according to the present invention comprises the steps of dispersing an insecticide in a reactive, liquid sealing material to form an insecticide-sealing material blend, applying a quantity of the insecticide-sealing material blend in the opening in the pad and around the conductors and/or conduits sufficient to seal the opening in the pad, and allowing the reactive liquid sealing material to react sufficiently to form a solid sealant. One method according to the present invention comprises the steps of dispersing one or more insecticides in a first liquid component of the sealant to form an insecticide blend; mixing the insecticide blend with a second liquid component of the sealant to form a mixture of insecticide and reacting sealant components; applying a quantity of the mixture of insecticide and reacting sealant components in a pad opening in a quantity sufficient to seal the pad opening; and allowing the mixture of insecticide and reacting sealant components to form a solid sealant which conforms to the pad opening and any objects, such as cables, conductors and/or conduits and ground leads, extending through the pad opening.

The insecticide is dispersed, preferably uniformly, in a first sealant component. The insecticide may be dispersed as solid particles or as a liquid in a first liquid sealant component. Preferably the insecticide is dissolved in a first sealant component to form a liquid mixture of the insecticide and the first sealant component. The mixture of insecticide and the first sealant component is mixed with a second sealant component to form a mixture of insecticide and reacting sealant components. The mixture of insecticide and reacting sealant components may be a dispersion of solid insecticide particles dispersed in an initially liquid mixture of reacting sealant components. Preferably the mixture of insecticide and reacting sealant components is initially a liquid mixture of insecticide dissolved in a liquid mixture of reacting sealant components. A quantity of the mixture of insecticide and reacting sealant components sufficient to seal the pad opening is placed in the pad opening. The reacting sealant components are allowed to react to form a solid sealant in which the insecticide is dispersed. Preferably, the solid sealant is flexible foam for the reasons explained above.

Another method according to the present invention comprises the steps of dispersing one or more insecticides in one or more liquid polyisocyanates to form an insecticide-polyisocyanate blend; applying a quantity of the mixture of the insecticide-polyisocyanate blend in a pad opening in a quantity sufficient to seal the pad opening; and allowing the insecticide-polyisocyanate blend to form a solid sealant which conforms to the pad opening and any objects, such as cables, conductors and/or conduits and ground leads, extending through the pad opening.

The insecticide is dispersed, preferably uniformly, in one or more liquid polyisocyanates. The insecticide may be dispersed as solid particles or as a liquid in the liquid polyisocyanates. Preferably the insecticide is dissolved in one or more liquid polyisocyanates. A quantity of the insecticide-polyisocyanate blend sufficient to seal the pad opening is placed in the pad opening. The reacting polyisocyanate components are allowed to react to form a solid sealant in which the insecticide is dispersed.

One preferred method of sealing the pad opening also includes the step of adding a well-known blowing agent to either the first sealant component or the second sealant component causing the mixture of insecticide and reacting sealant components to form a sealant which is flexible foam, although the foam may be rigid in some cases. Another preferred method of sealing the pad opening includes the step of adding a well-known blowing agent to the insecticide-polyisocyanate blend causing the insecticide-polyisocyanate blend to form a sealant which is a flexible foam, although the foam may be rigid in some cases.

Thus, according to the present invention a sealant including an insecticide is used to kill insects attempting to enter the URD transformer housing through the pad opening by sealing the pad opening through which underground cables and/or conduits extend into transformer housing.

The foregoing disclosure and description of the invention are illustrative and explanatory thereof, and various changes in the details of the illustrated embodiments and method of operation may be made without departing from the spirit of the invention.

What is claimed is:

1. A sealant for sealing around one or more conduits extending through an opening into an above ground electrical housing capable of providing a protected environment for insects, where such housing is selected from the group consisting of secondary pedestal boxes of street lights, secondary distribution pedestal boxes, telecommunication junction cabinets and pedestals, and electrical distribution pad mounted switches and circuit breakers, the sealant comprising:

a flexible foam sealing material which expands in an unset state and which is flexible in a final set state, the foam being positioned in the housing opening and sealing around a perimeter of the housing opening and around the conduits extending through the opening into the housing;

an insecticide dispersed in the flexible foam sealing material for killing insects attempting to enter the housing;

wherein the insecticide is selected from the group consisting of acephate, carbaryl, pyrenone, aldicarb and azinphos-methyl;

wherein the insecticide is a contact poison; and wherein the set foam substantially seals around the conduits extending through the opening into the housing as well as around the perimeter of the housing opening.

2. The sealant of claim 1 wherein the sealant is a polyurethane.

3. The sealant of claim 1 wherein the sealant has a set up time of from about one minute to about twenty-four hours.

4. A method of sealing around one or more conduits extending through an opening into an above ground electrical housing capable of providing a protected environment for insects, where such housing is selected from the group consisting of secondary pedestal boxes of street lights, secondary distribution pedestal boxes, telecommunication junction cabinets and pedestals, and electrical distribution pad mounted switches and circuit breakers, the method comprising the steps of:

a) dispersing a contact poison insecticide in a liquid sealing material to form an insecticide-sealing material blend;

b) adding a blowing agent to the insecticide-sealing material blend;

c) applying a quantity of the blowing agent and insecticide-sealing material blend in the opening in the housing and around the conductors or conduits sufficient to seal the opening in the housing;

d) allowing the sealing material and insecticide to react and expand from a first unset state having an initial volume to a second set state having an expanded volume, the expanded volume being sufficient to form a flexible foam insecticide sealant barrier within the opening; and e) wherein the set foam substantially seals around the conduits extending through the opening into the housing as well as around a perimeter of the housing opening.

5. The method of claim 3 wherein the dispersed insecticide is dissolved in the sealing material forming a liquid insecticide-sealing material blend.

6. A method of sealing around one or more conduits extending through an opening into an above ground electrical housing capable of providing a protected environment for insects, where such housing is selected from the group consisting of secondary pedestal boxes of street lights, secondary distribution pedestal boxes, telecommunication junction cabinets and pedestals, and electrical distribution pad mounted switches and circuit breakers, the method comprising the steps of:
   a) dispersing a contact poison insecticide in a first liquid component of a sealant to form an insecticide blend;
   b) mixing the insecticide blend with a second liquid component of the sealant forming a mixture of insecticide and reacting liquid sealant components;
   c) adding a blowing agent to at least one of first and second sealant components;
   d) applying a quantity of the mixture of insecticide, blowing agent and reacting liquid sealant components in the opening and around the conduits sufficient to seal the opening;
   e) allowing the reacting liquid sealant components to react and expand from a first unset state having an initial volume to a second set state having an expanded volume, the expanded volume being sufficient to form a flexible foam sealant barrier within the opening; and
   f) wherein the set foam substantially seals around the conduits extending through the opening into the housing as well as around a perimeter of the housing opening.

7. The method of claim 6 wherein the dispersed insecticide is dissolved in the first component of the sealant forming a liquid insecticide blend.

8. A method of sealing around one or more conduits extending through an opening into an above ground electrical housing capable of providing a protected environment for insects, where such housing is selected from the group consisting of secondary pedestal boxes of street lights, secondary distribution pedestal boxes, telecommunication junction cabinets and pedestals, and electrical distribution pad mounted switches and circuit breakers, the method comprising the steps of:
   a) dispersing a contact poison insecticide in a polyol to form an insecticide-polyol blend;
   b) mixing the insecticide-polyol blend with a polyisocyanate to form a mixture of insecticide and polyurethane forming sealant components;
   c) adding a blowing agent to the polyisocyanate forming sealing components;
   d) applying a quantity of the mixture of insecticide, blowing agent and the polyurethane forming sealing components in the opening and around the conduits sufficient to form a foam sealant in the opening;
   e) allowing the polyurethane forming sealant components to react and expand from a first unset state having an initial volume to a second set state having an expanded volume, the expanded volume being sufficient to form a flexible foam polyurethane sealant barrier within the opening with the insecticide dispersed throughout the flexible foam polyurethane sealant; and
   f) wherein the set foam substantially seals around the conduits extending through the opening into the housing as well as around a perimeter of the housing opening.

9. A method of sealing around one or more conduits extending through an opening into an above ground electrical housing capable of providing a protected environment for insects, where such housing is selected from the group consisting of secondary pedestal boxes of street lights, secondary distribution pedestal boxes, telecommunication junction cabinets and pedestals, and electrical distribution pad mounted switches and circuit breakers, the method comprising the steps of:
   a) dispersing a contact poison insecticide in at least one liquid polyisocyanate to form an insecticide-polyisocyanate blend;
   b) adding a blowing agent to the polyisocyanate forming sealing components;
   c) applying a quantity of the insecticide-polyisocyanate blend in the opening and around the conduits sufficient to form a flexible foam sealant in the opening;
   d) allowing the liquid polyisocyanate to react and expand from a first unset state having an initial volume to a second set state having an expanded volume, the expanded volume being sufficient to form a flexible foam polyurethane sealant barrier within the opening with the insecticide dispersed throughout the flexible foam polyurethane sealant; and
   f) wherein the set foam substantially seals around the conduits extending through the opening into the housing as well as around a perimeter of the housing opening.

* * * * *